United States Patent
Ikegame

[11] Patent Number: 6,055,221
[45] Date of Patent: Apr. 25, 2000

[54] GALVANO-MIRROR OPTICAL HEAD CAPABLE OF ADJUSTING RELATIVE POSITIONS

[75] Inventor: Tetsuo Ikegame, Hachioji, Japan

[73] Assignee: Olympus Optical Co., Ltd., Tokyo, Japan

[21] Appl. No.: 09/264,843

[22] Filed: Mar. 8, 1999

[30] Foreign Application Priority Data

Mar. 12, 1998 [JP] Japan .................................. 10-061117

[51] Int. Cl.[7] ....................................................... G11B 7/12
[52] U.S. Cl. ...................... 369/112; 369/119; 369/44.23; 369/44.14
[58] Field of Search .............................. 369/112, 119.13, 369/44.21, 44.14, 44.32, 44.18, 44.23, 44.15; 250/204, 236; 359/201, 206, 210, 218

[56] References Cited

U.S. PATENT DOCUMENTS

| | | | |
|---|---|---|---|
| 4,163,149 | 7/1979 | Sawano et al. | 250/204 |
| 4,785,438 | 11/1988 | Mizunoe | 369/13 |
| 5,054,866 | 10/1991 | Tomita et al. | 359/201 |
| 5,136,559 | 8/1992 | Nakayama | 369/32 |
| 5,151,890 | 9/1992 | Yonekubo | 369/112 |
| 5,159,588 | 10/1992 | Nakano et al. | 369/44.22 |
| 5,199,020 | 3/1993 | Kim et al. | 369/112 |
| 5,253,245 | 10/1993 | Rabedeau | 369/119 |
| 5,365,504 | 11/1994 | Noguchi | 369/112 |

FOREIGN PATENT DOCUMENTS

| | | |
|---|---|---|
| 2-267741 | 11/1990 | Japan . |
| 3-54740 | 3/1991 | Japan . |
| 2327291 | 1/1999 | United Kingdom . |

*Primary Examiner*—Tan Dinh
*Assistant Examiner*—Kim-Kwok Chu
*Attorney, Agent, or Firm*—Frishauf, Holtz, Goodman, Langer & Chick, P.C.

[57] ABSTRACT

An optical pickup comprises a semiconductor laser for emitting a light beam, a galvano-mirror for deflecting the light beam, a relay lens interposed between the laser and the mirror, and a condensing optical system for converging the light beam from the galvano-mirror on a storage medium. The condensing optical system includes a parallel flat plate, an imaging lens for changing the light beam from the galvano-mirror into a parallel light beam, a riser mirror for reflecting the parallel light beam, and an objective lens for converging the reflected light beam. The reflective surface of the galvano-mirror and the front focus of the objective lens are associated with each other in conjugate relative positions, which are adjusted by providing the parallel flat plate. The parallel flat plate is selected among prepared ones that have the same refractive index and different thicknesses. The selected parallel flat plate is expected to minimize the movement of a light beam at the front focus of the objective lens when the galvano-mirror is swung.

7 Claims, 4 Drawing Sheets

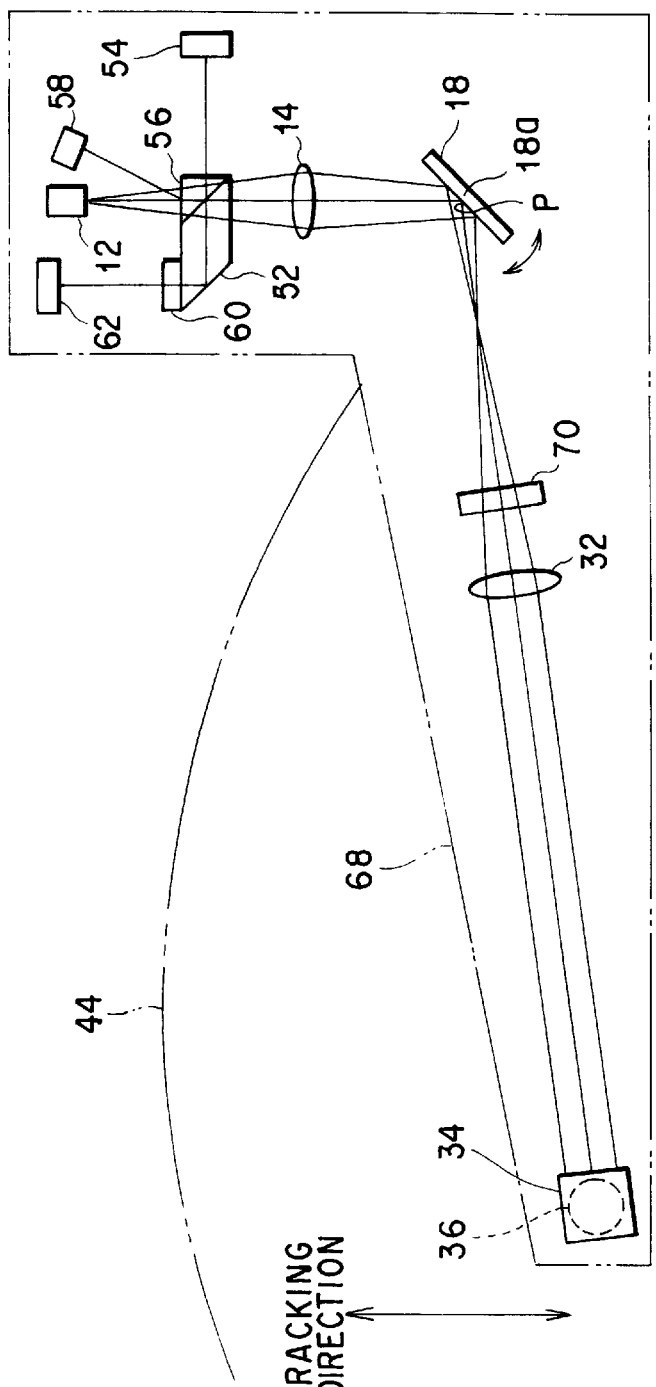
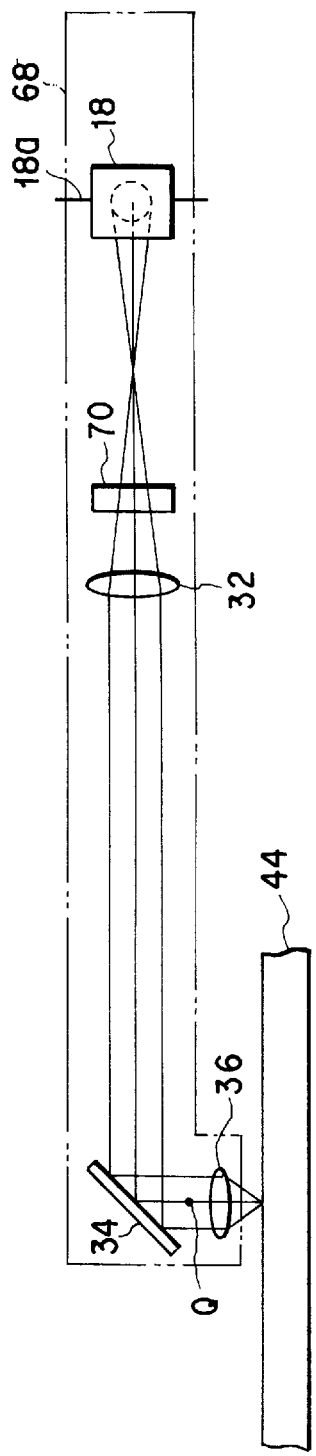
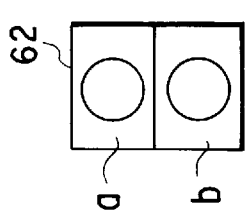

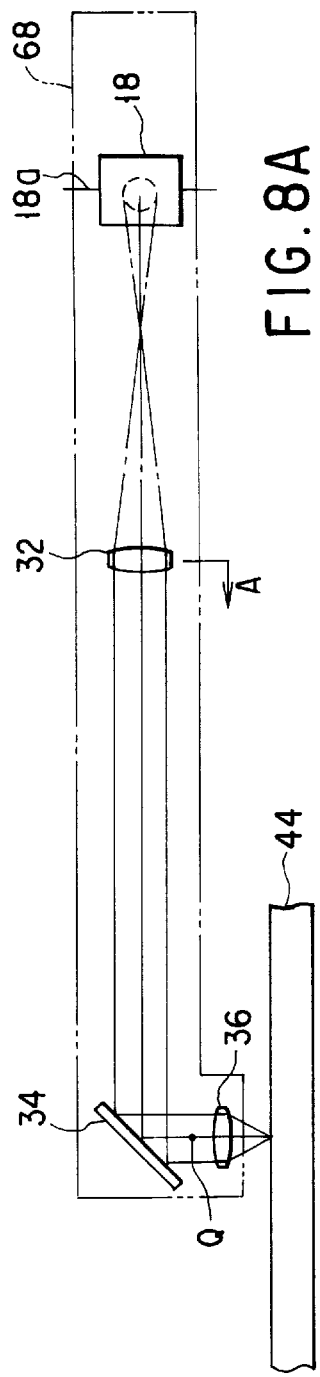
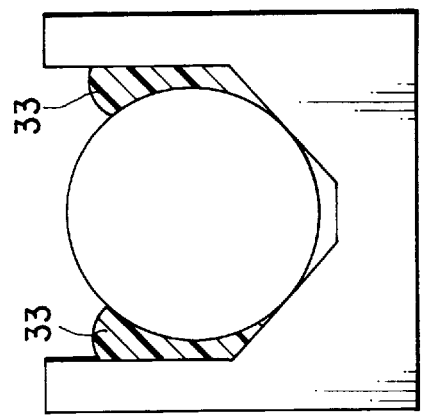
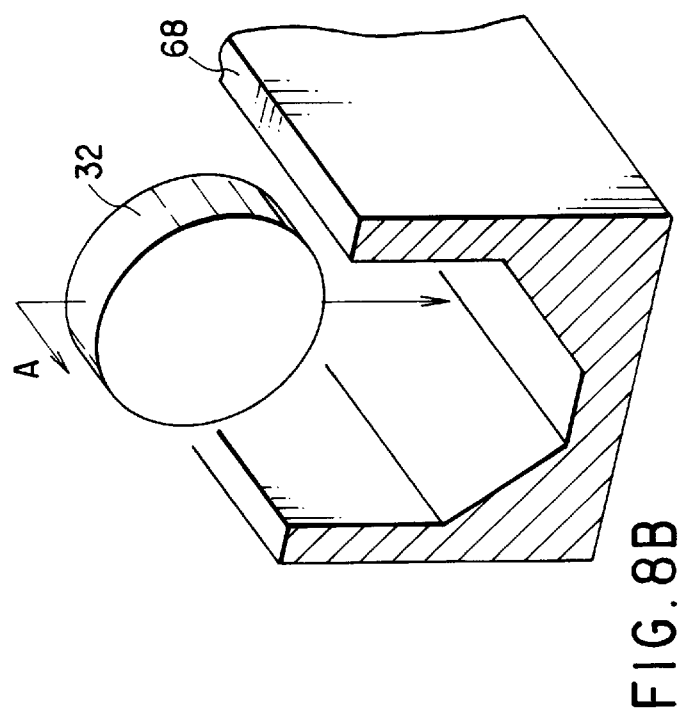

GALVANO-MIRROR OPTICAL HEAD CAPABLE OF ADJUSTING RELATIVE POSITIONS

BACKGROUND OF THE INVENTION

The present invention relates to an optical pickup adapted to control the direction of a light beam by means of a galvano-mirror (mirror-type deflecting device), for example.

Tracking control is effected by using a galvano-mirror in some of optical devices, such as information recording/reproducing devices for recording on and/or reproducing information from optical storage media, including an magneto-optic disk drive, write-once disk drive, phase-change disk drive, CD-ROM, DVD, optical card, etc. In carrying out the tracking control in the optical devices of this type, the angle of incidence of a light beam upon an objective lens is changed by controlling the inclination of the reflected beam by means of the galvano-mirror, and a beam spot that is formed on a storage medium by means of the objective lens is finely moved in the tracking direction.

If the reflected light beam is only inclined by means of the galvano-mirror, however, the light beam incident upon the objective lens is shifted in the direction perpendicular to its optical axis, so that the intensity distribution of light incident upon the objective lens is deflected inevitably. Thus, the beam spot may be deformed or tracking error signals may be subject to offsets.

In order to solve this problem, an arrangement is proposed in which a condensing or imaging lens is interposed between the objective lens and the galvano-mirror so that the reflective surface of the galvano-mirror and the front or condenser-side focus of the objective lens are in conjugate relation. In other words, there is a proposal to provide a condensing lens that associates the reflective surface of the galvano-mirror and the front focus of the objective lens in conjugate relative positions.

According to this arrangement, the reflected light beam is always incident upon the objective lens via its front focus without regard to the tilt of the reflective surface of the galvano-mirror. In consequence, the beam spot formed on the storage medium by the objective lens moves in accordance with the tilt of the reflective surface of the galvano-mirror.

If the focal length is deviated from a set value due to a workmanship error in the condensing lens, even in this arrangement, however, the conjugate relation between the reflective surface of the galvano-mirror and the front focus of the objective lens is broken off. This conjugate relation can be also broken off due to mechanical errors in carriages or the like that carry the galvano-mirror, objective lens, and condensing lens.

Thus, the beam spot may be deformed or tracking error signals may be subject to offsets, so that accurate recording and reproduction cannot be achieved.

BRIEF SUMMARY OF THE INVENTION

The present invention has been contrived in consideration of these circumstances, and its object is to provide an optical pickup in which the reflective surface of a galvano-mirror and the front focus of an objective lens are accurately in conjugate relative positions.

In order to achieve the above object, an optical pickup according to the present invention comprises a light source for emitting a light beam, a galvano-mirror for deflecting the light beam, an objective lens for converging the light beam on a storage medium, a condensing lens situated between the galvano-mirror and the objective lens, whereby the reflective surface of the galvano-mirror for the light beam and the front focus of the objective lens are associated with each other in substantially conjugate relative positions, and adjusting means for adjusting the substantially conjugate relative positions.

In an aspect of the invention, the adjusting means includes a plurality of parallel flat plates with different thicknesses prepared in advance, a selected one of the parallel flat plates being located in an optical path.

In another aspect of the invention, the adjusting means includes a transparent plate formed of a plurality of parallel flat plate portions with different thicknesses, one of the parallel flat plate portions being located alternatively in an optical path.

In still another aspect of the invention, the adjusting means includes a plurality of lenses with different focal lengths prepared in advance, a selected one of the lenses being used as a condensing lens.

In a further aspect of the invention, the adjusting means includes a mechanism for moving the galvano-mirror relatively to the condensing lens.

In an additional aspect of the invention, the adjusting means includes the condensing lens movable along the optical axis thereof.

In a further aspect of the invention, the adjusting means includes a mechanism for moving the objective lens relatively to the condensing lens.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A is a plan view of an optical pickup according to a first embodiment of the present invention;

FIG. 1B is a side view of the optical pickup shown in FIG. 1A;

FIG. 1C is a view of a photodetector shown in FIG. 1A, taken in the direction of its optical axis;

FIG. 8A is a plan view showing a part of an optical system of an optical pickup according to a fifth embodiment of the invention;

FIG. 8B is a perspective view, partially in section, showing an imaging lens and its surroundings; and FIG. 8C is a sectional view showing the imaging lens and its surroundings.

DETAILED DESCRIPTION OF THE INVENTION

[First Embodiment]

Figure 2:
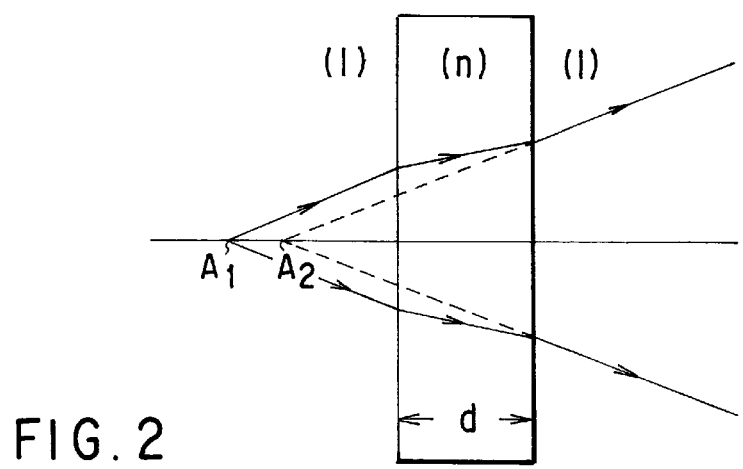
FIG. 2 is a diagram for illustrating the principle of the first embodiment of the invention.

As shown in FIGS. 1A and 1B, an optical pickup according to a first embodiment of the invention comprises a semiconductor laser 12 capable of emitting a light beam, a galvano-mirror 18 for deflecting the light beam, and a relay lens 14 that is located between the elements 12 and 18 and doubles as a collimating lens. The galvano-mirror 18 is supported so as to be swingable around an axis 18a that is perpendicular to the drawing plane of FIG. 1A. The orientation of the surface of the mirror 18 is controlled by means of a drive mechanism (not shown).

Further, the optical pickup comprises a condensing optical system for converging the light beam from the galvano-mirror 18 on a storage medium 44, which is located under the pickup.

The condensing optical system includes a parallel flat plate 70, an imaging lens (condensing lens) 32 for changing the light beam from the galvano-mirror 18 into a parallel light beam, a riser mirror 34 for reflecting the light beam from the lens 32 downward, and an objective lens 36 for converging the light beam from the mirror 34.

Furthermore, the optical pickup comprises a prism 52, a photodiode 54 for light quantity monitoring, a hologram 56, a photodiode 58 for tracking error detection, a Wollaston prism 60, and a photodetector 62.

The prism 52 guides a part of the light beam from the semiconductor laser 12 and a return light beam from the storage medium 44 to the photodiode 54 for light quantity monitoring and the Wollaston prism 60, respectively. The Wollaston prism 60 divides the light beam in the direction perpendicular to the drawing plane, and the divided light beams are applied to the photodetector 62.

The hologram 56 guides the return light beam, transmitted through the prism 52, to the photodiode 58 for tracking error detection.

As shown in FIG. 1C, the photodetector 62 comprises a photodiode that includes two light receiving sections a and b. If output signals from the light receiving sections a and b of the photodetector 62 are represented by $S_a$ and $S_b$, respectively, a regenerative signal obtained is given by $S_a - S_b$.

The above-mentioned optical elements are arranged on, for example, a swing member supported for swing motion or a moving body supported for translation. The direction of movement of the objective lens 36 that is caused by the swing motion or translation is adjusted to a direction substantially perpendicular to the track of the storage medium 44, that is, a tracking direction.

The divergent light beam emitted from the semiconductor laser 12 is changed into a convergent light beam by the relay lens 14, and then reflected toward the imaging lens 32 by the galvano-mirror 18.

The light beam reoriented by the condensing optical system is transmitted through the parallel flat plate 70 and changed into a parallel light beam by the imaging lens 32. Thereafter, the light beam is reflected downward by the riser mirror 34, converged on the storage medium 44 by the objective lens 36, and forms a beam spot on the storage medium 44.

As the storage medium 44 is moved relatively to the objective lens 36 by being rotated, for example, focusing control and tracking control are carried out. The focusing control is effected by moving the relay lens 14 along its optical axis, while the tracking control is effected by swinging the galvano-mirror 18 slightly, for example 1 to 2°, around the axis 18a.

Since the imaging lens 32 is located between the galvano-mirror 18 and the objective lens 36, the mirror 18 can enjoy a wide angular range. More specifically, the mirror 18 and the front focal point of the lens 36 are located at substantially conjugate positions that are substantially conjugate with each other with respect to the imagining lens 32, so that the movement of the light beam in the front-focus position of the objective lens 36 is very small even when tracking adjustment is made by swinging the mirror 18. Accordingly, an offset of a tracking error signal during the tracking control is very small.

If the parallel light beam is projected on the galvano-mirror 18 and then on the objective lens 36 without ceasing to be parallel, the light beam incident upon the objective lens moves extensively when the tracking control is carried out by swinging the mirror 18, so that the offset of the tracking error signal inevitably becomes very large.

In the case where a seek mechanism of a swing-arm type for rotation around the axis perpendicular to the drawing plane is used as an enclosure 68, its center of rotation is located near the galvano-mirror, preferably. In this case, the galvano-mirror, which includes heavy parts such as a magnet, yoke, etc., is situated near the center of rotation, so that the swing arm has a small moment of inertia and high driving sensitivity.

The following is a description of adjustment of the conjugate relative positions of the reflective surface of the galvano-mirror 18 and the front focus of the objective lens 36, which is the theme of the present invention.

Referring first to FIG. 2, there will be described the principle of the adjustment. As shown in FIG. 2, the deviation $A_1 A_2$ in position between an object $A_1$ and an image $A_2$ is given by $A_1 A_2 = d(1-1/n)$ when the object $A_1$ is viewed substantially vertically through a parallel flat plate with a thickness d and refractive index n in air (which has the refractive index of 1).

This indicates that the position of the focal point can be moved along the optical axis according to the thickness and refractive index of a parallel flat plate that is located in the optical path. In other words, the focal point can be shifted to a desired position by locating in the optical path a parallel flat plate that has a thickness and refractive index corresponding to the desired shift value.

Based on this concept, according to the present embodiment, shift of the reflective surface of the galvano-mirror 18 and the front focal point of the objective lens 36 from the substantially conjugate positions is corrected by using a parallel flat plate with a suitable thickness that is selected among a plurality of parallel flat plates prepared having different thicknesses.

In FIGS. 1A to 1C, a plurality of parallel flat plates having the same refractive index and different thicknesses are prepared for the parallel flat plate 70 that is interposed between the galvano-mirror 18 and the imaging lens 32. The prepared parallel flat plates are supposed to have, for example, five thicknesses, 1.0 mm, 1.2 mm, 1.4 mm, 1.6 mm, and 1.8 mm, individually. For the parallel flat plate having the intermediate thickness of 1.4 mm, the reflective surface P of the mirror 18 and the front focus Q of the objective lens 36 are designed to be associated with each other in conjugate relative positions by the imaging lens 32.

The parallel flat plate, 1.4 mm thick, is first located in the optical path, the galvano-mirror 18 is swung around its axis of rotation, and the then movement of a light beam at the front focus of the objective lens 36 is detected by means of a photodetector or the like.

In the case where the reflective surface P of the galvano-mirror 18 and the front focus Q of the objective lens 36 are associated with each other in conjugate relative positions by the imaging lens 32, the light beam does not move at the focus Q. In the case where the reflective surface P of the mirror 18 and the front focus Q of the lens 36 are not associated in conjugate relative positions by the imaging lens 32, due to positional errors of the galvano-mirror 18, imaging lens 32, and mirror 34 or an error in the focal length of the lens 32, however, the light beam moves at the focus Q.

If there is no movement of the light beam at the front focus Q of the objective lens 36, therefore, it can be concluded that the reflective surface P of the galvano-mirror 18 and the front focus Q of the lens 36 are associated with each other in conjugate relative positions by the imaging lens 32, and the 1.4-mm-thick parallel flat plate is used directly as the parallel flat plate 70.

If there is a movement of the light beam at the front focus Q of the objective lens 36, on the other hand, the parallel flat plate is replaced with a thicker or thinner one that allows a smaller or no movement of the beam.

Thus, the suitable parallel flat plate for use is selected among a plurality of alternatives, high-reliability adjustment of the conjugate relative positions of the reflective surface of the galvano-mirror 18 and the objective lens 36 can be realized without using any complicated adjustment mechanism.

In the case described above, the prepared parallel flat plates have the thicknesses that vary by degrees of 0.2 mm. If these thicknesses gradate by finer degrees of 0.05 mm or the like, the conjugate relative positions of the reflective surface of the galvano-mirror 18 and the objective lens 36 can be adjusted more accurately.

According to the present embodiment, a plurality of parallel flat plates having the same refractive index and different thicknesses are prepared for the parallel flat plate 70 that is interposed between the galvano-mirror 18 and the imaging lens 32. Alternatively, however, a plurality of parallel flat plates having the same thickness and different refractive indexes may be prepared for this purpose. If a lot of parallel flat plates with smaller differences in refractive index are prepared in this case, the conjugate relative positions of the reflective surface of the galvano-mirror 18 and the objective lens 36 can be adjusted more accurately.

Figure 3:
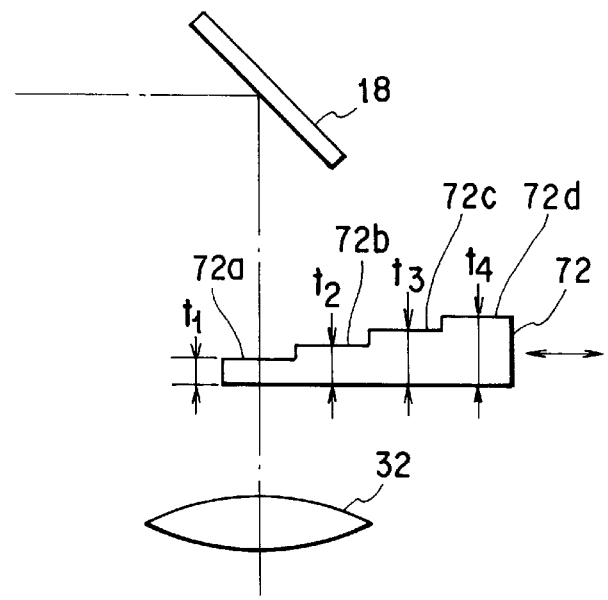
FIG. 3 is a plan view showing a part of an optical system of an optical pickup according to a modification of the first embodiment.

As shown in FIG. 3, moreover, the parallel flat plate 70 interposed between the galvano-mirror 18 and the imaging lens 32 may be formed of a transparent plate 72 that includes a plurality of parallel flat plate portions having different thicknesses. The transparent plate 72 includes parallel flat plate portions 72*a*, 72*b*, 72*c* and 72*d* that have thicknesses $t_1$, $t_2$, $t_3$ and $t_4$, respectively. The plate 72 is movable substantially at right angles to the optical axis. The adjustment of the conjugate relative positions of the reflective surface of the galvano-mirror 18 and the objective lens 36 is made by moving the transparent plate 72 so that the parallel flat plate portion with a suitable thickness is located on the optical path. Although this arrangement requires an additional space for the transparent plate 72, it can manage with only one optical member.

Figure 4:
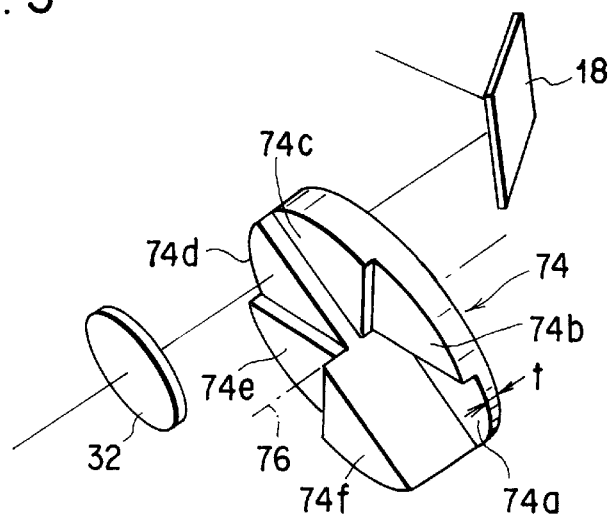
FIG. 4 is a perspective view showing a part of an optical system of an optical pickup according to another modification of the first embodiment.

As shown in FIG. 4, furthermore, the parallel flat plate 70 interposed between the galvano-mirror 18 and the imaging lens 32 may be formed of a disk-shaped transparent plate 74 that includes a plurality of parallel flat plate portions having different thicknesses. The transparent plate 74 includes fan-shaped parallel flat plate portions 74*a*, 74*b*, 74*c*, 74*d*, 74*e* and 74*f* that have thicknesses t, 2t, 3t, 4t, 5t and 6t, respectively. The plate 74 is supported for rotation around an axis 76 that extends parallel to the optical axis. The adjustment of the conjugate relative positions of the reflective surface of the galvano-mirror 18 and the objective lens 36 is made by rotating the transparent plate 74 so that the fan-shaped parallel flat plate portion with a suitable thickness is located on the optical path. Although this arrangement requires an additional space for the transparent plate 74, it can manage with only one optical member.

[Second Embodiment]

Figure 5:
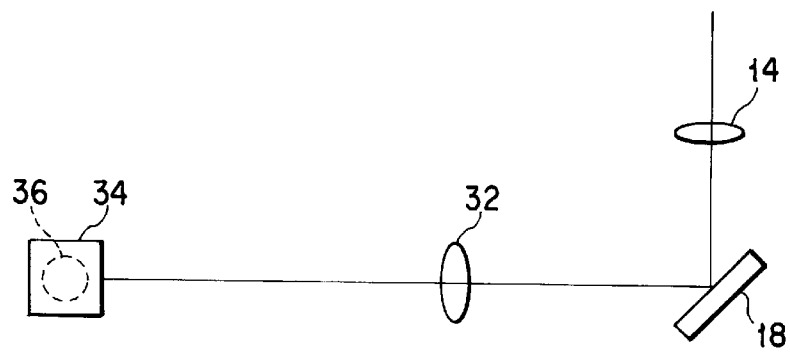
FIG. 5 is a plan view showing a part of an optical system of an optical pickup according to a second embodiment of the invention.

An optical pickup according to a second embodiment of the invention will now be described with reference to the accompanying drawing of FIG. 5. FIG. 5 schematically shows a part of an optical system of the optical pickup according to the present embodiment. For other parts, the second embodiment is arranged in the same manner as the first embodiment.

According to the present embodiment, only an imaging lens 32 is interposed between a galvano-mirror 18 and a riser mirror 34, and a plurality of lenses having different focal lengths are prepared for the imaging lens 32.

Among these prepared lenses, one that minimizes the movement of the light beam at the front focus Q of an objective lens 36 is used as the imaging lens 32.

The present embodiment requires no optical element, such as a parallel flat plate, for conjugate relation compensation.

[Third Embodiment]

Figure 6:
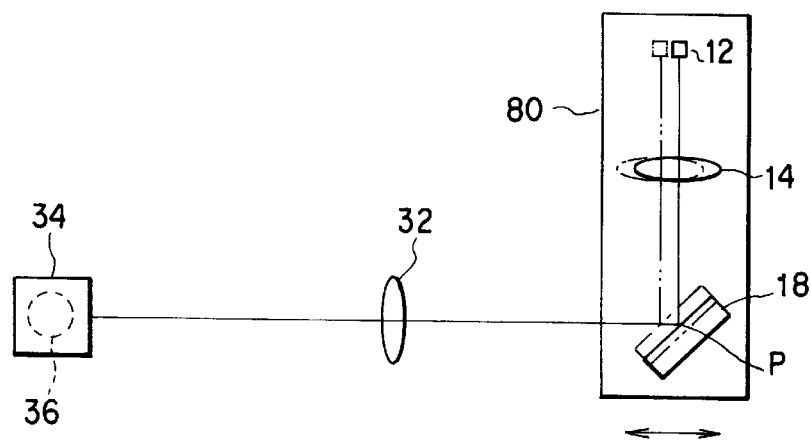
FIG. 6 is a plan view showing a part of an optical system of an optical pickup according to a third embodiment of the invention.

An optical pickup according to a third embodiment of the invention will now be described with reference to the accompanying drawing of FIG. 6. FIG. 6 schematically shows an optical system of the optical pickup according to the present embodiment. As regards parts that are not shown in FIG. 6, the third embodiment is arranged in the same manner as the first embodiment.

According to the present embodiment, an optical system 80, which includes a semiconductor laser 12, a relay lens 14, and a galvano-mirror 18, is supported so as to be movable along the axis of an imaging lens 32, as indicated by arrow A.

The conjugate relative positions of the reflective surface of the galvano-mirror 18 and an objective lens 36 is adjusted by regulating the position of the optical system 80 so that the movement of the light beam at the front focus of the objective lens 36 is minimized when the light beam is oscillated by means of the reflective surface of the mirror 18. In other words, the adjustment of the conjugate relative positions of the reflective surface of the galvano-mirror 18 and the front focus of the objective lens 36 is made by moving the optical system 80 to change the distance between the imaging lens 32 and the mirror 18.

[Fourth Embodiment]

Figure 7:
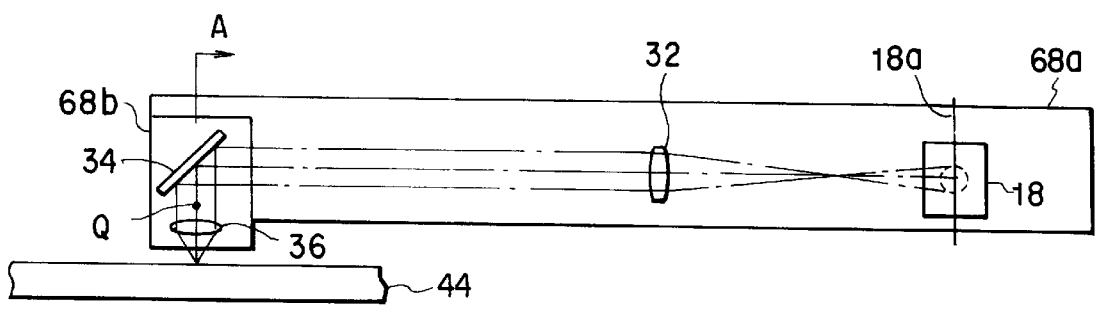
FIG. 7 is a plan view showing a part of an optical system of an optical pickup according to a fourth embodiment of the invention.

An optical pickup according to a fourth embodiment of the invention will now be described with reference to the accompanying drawing of FIG. 7. FIG. 7 schematically shows an optical system of the optical pickup according to the present embodiment. As regards parts that are not shown in FIG. 7, the fourth embodiment is arranged in the same manner as the first embodiment.

According to the present embodiment, an enclosure 68 is divided between a section 68a, which holds a riser mirror 34 and an objective lens 36, and the remaining section 68b. The enclosure section 68b is movable relatively to the enclosure section 68a in the direction of arrow A.

The conjugate relative positions of the reflective surface of a galvano-mirror 18 and the objective lens 36 is adjusted by moving the enclosure section 68b in the direction of arrow A. In other words, the adjustment of the conjugate relative positions of the reflective surface of the galvano-mirror 18 and the objective lens 36 is made by moving the riser mirror 34 and the objective lens 36 with respect to an imaging lens 32 to change the front focus Q of the objective lens 36 relative to the imaging lens 32.

The respective positions of the objective lens 36 and the riser mirror 34 may be adjusted separately.

[Fifth Embodiment]

An optical pickup according to a fifth embodiment of the invention will now be described with reference to the accompanying drawings of FIGS. 8A, 8B and 8C. FIG. 8A schematically shows an optical system of the optical pickup according to the present embodiment, and FIGS. 8B and 8C show an imaging lens and its surroundings. As regards parts that are not shown in these drawings, the fifth embodiment is arranged in the same manner as the first embodiment.

According to the present embodiment, the imaging lens 32 is supported for movement in its axial direction (direction of arrow A), as shown in FIG. 8A. More specifically, the cylindrical peripheral surface of the imaging lens 32 is engagement with a V-shaped groove in an enclosure 68, as shown in FIG. 8B, and the conjugate relative positions of the reflective surface of a galvano-mirror 18 and an objective lens 36 is adjusted by sliding the imaging lens 32 in its axial direction in the groove. After the position adjustment, the imaging lens 32 is fixed by pouring an adhesive agent 33 into spaces on either side thereof, as shown in FIG. 8C.

According to the present embodiment, the imaging lens 32 is held directly in engagement with the enclosure 68 for movement, so that there is no need of any holding member for the imaging lens. Thus, there is no increase in the number of essential components, so that costs are not very high. In the case where the imaging lens 32 is formed of a glass press lens, its outer peripheral surface can be a smooth high-precision surface. Thus, the imaging lens 32 can enjoy high adjustability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical pickup for optically recording on and/or reproducing information from a storage medium, comprising:
   a light source for emitting a light beam;
   a galvano-mirror for deflecting the light beam;
   an objective lens for converging the light beam on the storage medium;
   a condensing lens, situated between the galvano-mirror and the objective lens, for permitting the reflective surface of the galvano-mirror and the front focal point of the objective lens to be located at substantially conjugate positions that are substantially conjugate with each other; and
   adjusting means for making adjustments so that the reflective surface of the galvano-mirror and the front focal point of the objective lens are at the substantially conjugate positions.

2. An optical pickup according to claim 1, wherein said adjusting means includes a plurality of parallel flat plates with different thicknesses prepared in advance, a selected one of the parallel flat plates being located in an optical path, so that the substantially conjugate relative positions are adjusted.

3. An optical pickup according to claim 1, wherein said adjusting means includes a transparent plate formed of a plurality of parallel flat plate portions with different thicknesses, one of the parallel flat plate portions being located alternatively in an optical path, so that the substantially conjugate relative positions are adjusted.

4. An optical pickup according to claim 1, wherein said adjusting means includes a plurality of lenses with different focal lengths prepared in advance, a selected one of the lenses being used as a condensing lens, so that the substantially conjugate relative positions are adjusted.

5. An optical pickup according to claim 1, wherein said adjusting means includes a mechanism for moving the galvano-mirror relatively to the condensing lens, the galvano-mirror being moved, so that the substantially conjugate relative positions are adjusted.

6. An optical pickup according to claim 1, wherein said adjusting means includes the condensing lens movable along the optical axis thereof, the condensing lens being moved along the optical axis, so that the substantially conjugate relative positions are adjusted.

7. An optical pickup according to claim 1, wherein said adjusting means includes a mechanism for moving the objective lens relatively to the condensing lens, the objective lens being moved, so that the substantially conjugate relative positions are adjusted.

* * * * *